April 10, 1945.   D. E. TRUCKSESS   2,373,208
VOLTAGE REGULATION
Filed March 2, 1943
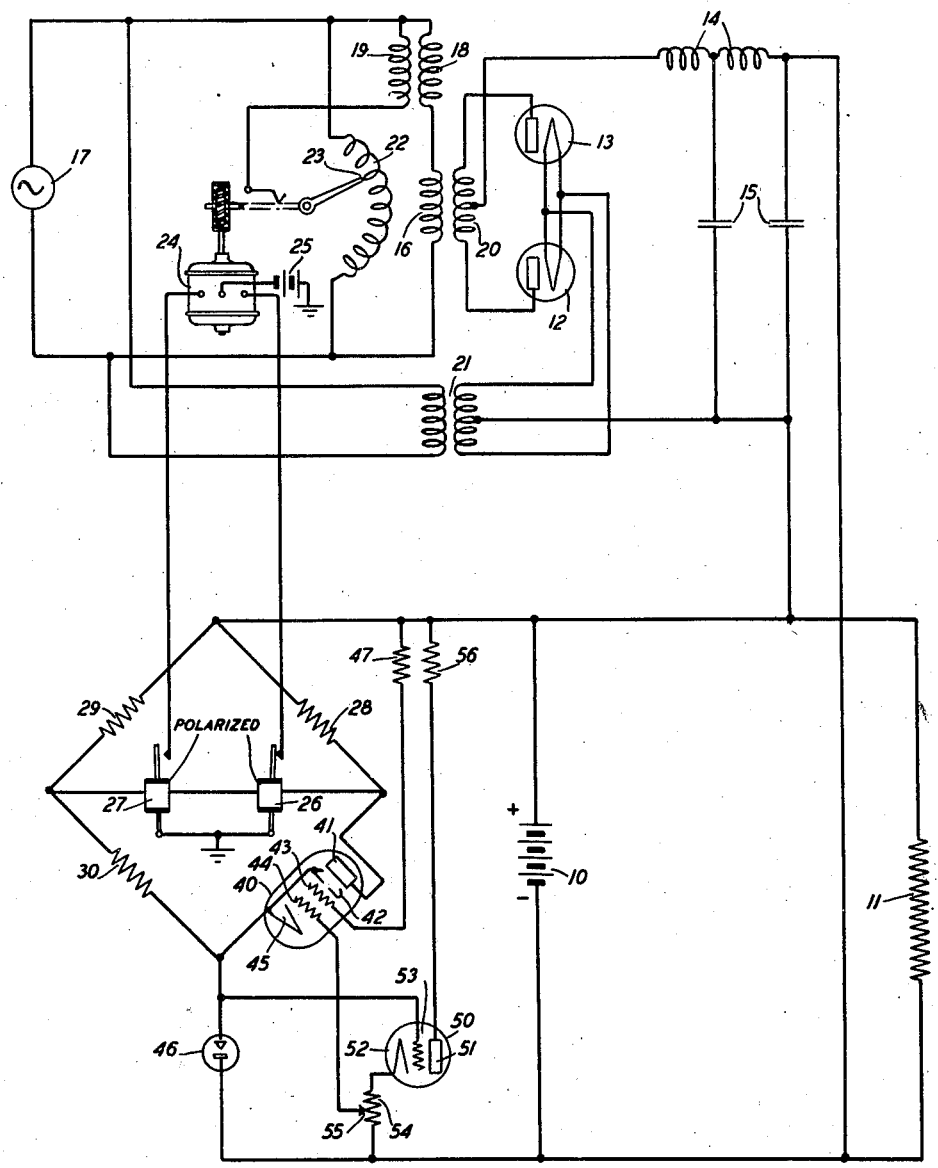
INVENTOR
D. E. TRUCKSESS
BY
G. F. Heuerman
ATTORNEY Patented Apr. 10, 1945

2,373,208

UNITED STATES PATENT OFFICE 2,373,208

VOLTAGE REGULATION

David E. Trucksess, Summit, N. J., assignor to Bell Telephone Laboratories, Incorporated, New York, N. Y., a corporation of New York Application March 2, 1943, Serial No. 477,689

6 Claims. (Cl. 175—363)

This invention relates to voltage regulation and particularly to an improved voltage regulator of the type in which the alternating voltage impressed upon a rectifier which supplies direct current to a load is varied under control of load voltage variations for maintaining the average load voltage substantially constant.

In accordance with a specific embodiment of the invention shown and described herein for the purpose of illustration, there is provided a means responsive to voltage variations across the load to which current is supplied from an alternating current rectifier for causing the alternating voltage supplied to the rectifier anode-cathode circuit to vary by such amount and in such direction that the average load voltage is maintained substantially constant. The alternating voltage supplied to the rectifier anode-cathode circuit is changed by means of a booster type control equipment comprising an autotransformer having its primary circuit connected across the alternating current line and its continuously variable secondary circuit connected in series with the primary winding of a booster transformer, the secondary winding of the booster transformer being connected in series with the primary winding of a transformer which supplies anode voltage to the rectifier tubes to the alternating current supply line. The number of turns in the secondary circuit of the autotransformer is varied by means of a movable brush in electrical contact with the autotransformer winding which brush is driven in either direction by means of a reversible motor the energization of which is controlled by polarized relays connected to the galvanometer corners of a resistance bridge circuit. The output or anode-cathode circuit of an electronic device is connected in one of the bridge arms so that one or the other of the relays is operated when the bridge circuit becomes unbalanced due to an increase or decrease of the output resistance of the electronic device. Variations in load voltage are amplified by an electronic amplifier and the amplified voltage is applied to the input or control electrode-cathode circuit of the electronic device in the bridge circuit for controlling its resistance.

In order to obtain a high rate of change of output resistance of the electronic device in the bridge circuit with respect to voltage applied to the input or control circuit of the device, the potential of the control electrode should preferably be maintained at a negative value with respect to the potential of the cathode. It is also desirable to avoid the necessity for providing sources of direct voltage other than voltages which are derived from the source of load voltage for supplying direct potentials to the electrodes of the electric discharge devices. To realize these desirable operating conditions the positive input terminal of the bridge circuit is connected to the positive load voltage terminal and the negative input terminal of the bridge is maintained at a potential which is positive with respect to the negative load voltage terminal by connecting between the negative bridge terminal and the negative load voltage terminal a cold cathode tube the resistance of which varies in response to current changes over the operating range in such manner that the voltage drop across the tube terminals remains substantially constant. The load voltage is impressed upon a current path including the anode-cathode path of the amplifier electronic device and a resistor connected between the amplifier cathode and the negative load voltage terminal and a control grid of the electronic device in the bridge circuit is connected to the resistor. The positive terminal of the cold cathode tube is connected to the control grid of the amplifier device to maintain it at a desired operating potential with respect to its cathode. The electronic device employed in the bridge circuit is preferably of the beam power type the screen grid of which is connected to the positive load voltage terminal either directly or, if the load voltage is too high, through a resistor.

The single figure of the drawing to which reference will now be made is a schematic view of a voltage regulator constructed in accordance with the invention.

The voltage regulator may be employed for controlling the charging of a battery 10 across which a variable load 11 is connected. The battery is charged by direct current from a full-wave rectifier comprising rectifier tubes 12 and 13, the output circuit of which is connected through a suitable low-pass filter comprising series inductive elements 14 and shunt condensers 15 to the terminals of battery 10. Alternating current is supplied to the primary transformer winding 16 from a line connected to an alternating current source 17 through the secondary winding 18 of a booster transformer having a primary winding 19. A secondary winding 20 associated with transformer winding 16 supplies voltage to the anodes of the rectifier tubes 12 and 13. Heating current is supplied to the cathodes of the rectifier tubes from a transformer 21 the primary of which is connected to the alternating current line. The winding of an autotransformer 22 is connected across the alternating current supply line and a portion of the voltage across the autotransformer winding is impressed upon the winding 19 of the booster transformer. The voltage across the booster transformer and therefore the voltage impressed upon the rectifier through transformer 16, 20 is changed due to the movement of a brush 23 along the winding of the autotransformer 22 to vary the number of turns of the winding in the secondary circuit of the autotransformer. The brush 23 is moved along the winding 22 in either direction by a reversible motor 24 in accordance with its energization by current from a suitable source such as grounded battery 25, the motor being energized to cause its rotation in one direction when the energizing circuit is completed through the armature and contact of polarized relay 26 and in the opposite direction when the energizing circuit is completed through the armature and contact of polarized relay 27.

The windings of polarized relays 26 and 27 are connected in series in a current path connecting the galvanometer corners of a resistance bridge circuit three arms of which comprise resistors 28, 29 and 30, respectively, and the fourth arm of which is the anode-cathode or output circuit of a beam power electric discharge device 40 having an anode 41, a beam forming plate 42, a screen grid 43, a control grid 44, and a cathode 45. One of the input corners of the bridge formed by a connection to a terminal of each of resistors 28 and 29 is connected to the positive terminal of the voltage across load 11 and battery 10. The other input terminal of the bridge is connected to a terminal of a cold cathode tube 46 the other terminal of which is connected to the negative terminal of the voltage across the load 11 and battery 10. The resistance of the cold cathode tube 46 varies in such a manner in response to changes in current passing through the tube that the voltage measured across the tube terminals remains substantially constant over the operating range of current. The screen grid 43 is connected to the positive load voltage terminal through a resistor 47 which causes the voltage at the screen grid to be reduced to a desired operating value. Where the voltage difference between the positive load voltage terminal and the voltage at cathode 45 is less than the maximum operating value of screen grid voltage the resistor 47 may be omitted. The amplifier electric discharge device 50 having an anode 51, a cathode 52 and a control grid 53 has its anode-cathode circuit in a current path connected in shunt to the load voltage, the anode being connected through a resistor 56 to the positive load voltage terminal and the cathode being connected through a potentiometer 54 to the negative load voltage terminal. The control grid 53 of tube 50 is connected to the cathode 45 of tube 40 and the control grid 44 of tube 40 is connected to a variable tap 55 of potentiometer 54.

It will be noted that current from the load voltage source flows through the bridge circuit and the cold cathode tube 46 to produce a substantially constant voltage drop across the cold cathode tube and that the cold cathode tube is connected in the input or control grid-cathode circuit of tube 40 and also of tube 50 to bias the control grids 44 and 53 of these tubes, respectively, to the required operating potential.

The regulator operates in the following manner. When there is an increase in the voltage across the load 11 and battery 10 with respect to its normal value, the current flowing through the anode-cathode path of amplifier tube 50 and potentiometer 54 increases to cause the control grid 44 of tube 40 to become relatively less negative with respect to its cathode. The resistance of the anode-cathode path of tube 40 is thus decreased to unbalance the bridge circuit and to cause current to flow through the windings of relays 26 and 27 in such direction as to cause one of the relays, relay 26 for example, to operate. As a result the motor 24 is caused to rotate in a direction to decrease the voltage impressed upon the primary winding 19 of the booster transformer and therefore to decrease the voltage impressed upon the transformer 16, 20 which supplies plate voltage to the rectifier tubes 12 and 13. The current output of the rectifier is thus decreased to cause a reduction in load voltage and, therefore, a reduction in current flowing through potentiometer 54. The control grid potential of electric discharge tube 40 becomes more negative to increase its anode-cathode resistance to restore the balance of the bridge circuit and thus cause the armature of relay 26 to be released and the energizing circuit for motor 24 to be opened. Similarly when the load voltage falls below its normal operating value the current flowing through potentiometer 54 is decreased to make the grid 44 more negative. The resistance of the anode-cathode path of tube 40 is thus increased to cause the bridge to become unbalanced and current to flow through the windings of relays 26 and 27 in a direction to cause the operation of relay 27. The motor 24 of the booster control equipment is thus operated in a direction to cause an increase in the alternating current voltage supplied to the rectifier tubes and a resulting increase in output current from the rectifier.

It is seen, therefore, that when the load voltage changes by a certain small amount from a desired normal value, the regulator operates to restore the load voltage to the normal value. This normal or average value of the load voltage may be changed by changing the setting of the tap 55 of potentiometer 54. For example, the average load voltage may be reduced by increasing the portion of resistor 54 which is in the input circuit of electric discharge tube 40. This adjustment causes the control grid 44 of the discharge tube 40 to become less negative with respect to its cathode with the result that relay 26 operates to cause a reduction in the load voltage.

While the amplifier discharge device 50 is preferably a triode, a device having additional electrodes could be used. If a device having a screen grid were used, for example, an operating potential would be impressed upon the screen grid by connecting it to a desired portion of a voltage dividing resistor connected in shunt with respect to the load.

What is claimed is:

1. Apparatus responsive to changes in direct current voltage across a load circuit for maintaining the average load voltage substantially constant comprising an electronic device having an anode, a cathode and a control electrode, a resistance bridge circuit having resistors in each of three arms thereof and the anode-cathode path of said electronic device in the fourth bridge arm, means for connecting one of the input terminals of said bridge to the positive terminal of said load voltage, the cathode of said electronic device being connected to the second input terminal of said bridge, biasing means in a current path connecting said second input terminal of said bridge to the negative load voltage terminal for maintaining said second input bridge terminal at a substantially constant positive potential with respect to the negative terminal of said load voltage in response to current from said load voltage source flowing through said bridge circuit and said biasing means, means responsive to current flowing in a circuit connected to the galvanometer corners of said bridge when the bridge becomes unbalanced for causing the average load voltage to be maintained substantially constant, and means for impressing upon said control electrode a potential which varies in accordance with load voltage variations for causing a change in the anode-cathode resistance of said electronic device and a resulting unbalancing of said bridge.

2. An apparatus in accordance with claim 1 in which the last-mentioned means called for in that claim comprises a second electronic device having an anode, a cathode and a control electrode, a current path connected in shunt to the load voltage source including the anode-cathode path of said second electronic device and a resistor, and means for connecting a portion of said shunt path in the control electrode-cathode circuit of the first-mentioned electronic device.

3. An apparatus in accordance with claim 1 in which the last-mentioned means called for in that claim comprises a second electronic device having an anode, a cathode and a control electrode, a current path connected in shunt to the load voltage source including the anode-cathode path of said second electronic device, a potentiometer having two end terminals and an adjustable tap, one of said end terminals being connected to the negative load voltage terminal and the other end terminal being connected to the cathode of said second electronic device and means for connecting said adjustable tap to the control electrode of said first-mentioned electronic device.

4. In combination, rectifying means for supplying direct current to a load, means for supplying alternating current to said rectifier, means for regulating the voltage of the alternating current supplied to said rectifier for maintaining the average load voltage substantially constant, a first electric discharge device having an anode, a cathode and a control electrode, means connecting said anode to the positive load voltage terminal, resistive means for connecting said cathode to the negative load voltage terminal, a resistance bridge circuit having input terminals to which a voltage is applied and a circuit connected to the galvanometer terminals of the bridge through which current flows when the bridge becomes unbalanced due to a change in resistance of one of the bridge arms, a second electric discharge device having an anode, a cathode and a control electrode, means for connecting the anode-cathode path of said second electric discharge device in said one bridge arm, said cathode being connected to the negative input terminal of said bridge, means for connecting the positive input terminal of the bridge to the positive terminal of said load voltage, means in a current path connecting the negative load voltage terminal with the negative input terminal of the bridge for maintaining said negative bridge input terminal at a substantially fixed positive potential with respect to said negative load voltage terminal in response to current flowing through said means, means for connecting the control electrode of said first electric discharge device to the cathode of said second electric discharge device, means for connecting the control electrode of said second electric discharge device to a portion of said resistive means, and means in said circuit connecting the galvanometer terminals of said bridge responsive to the current flowing therein for controlling said alternating voltage regulating means.

5. A combination in accordance with claim 4 in which said second electric discharge device comprises a screen grid which is electrically connected to the positive load voltage terminal.

6. A first electronic device having a cathode-control element circuit and an anode-cathode circuit, a resistance common to both said circuits of said first electronic device, a constant voltage device in said cathode-control element circuit of said first electronic device, a second electronic device having a cathode-control element circuit and an anode-cathode circuit and having said constant voltage device in both its cathode-control element circuit and its anode-cathode circuit, a common source of variable potential supplying voltage to the anode-cathode circuits of both said devices, and means under control of the current variations through the anode-cathode circuit of said second electronic device for controlling the voltage supplied from said source to both said anode-cathode circuits tending to maintain said voltage constant.

DAVID E. TRUCKSESS.